(12) United States Patent
Chen

(10) Patent No.: US 7,469,621 B2
(45) Date of Patent: Dec. 30, 2008

(54) TABLE SAW

(75) Inventor: Jung-Huo Chen, Taichung Hsien (TW)

(73) Assignee: Rexon Industrial Corporation Ltd, Taichung Hsien (TW)

( * ) Notice: Subject to any disclaimer, the term of this patent is extended or adjusted under 35 U.S.C. 154(b) by 56 days.

(21) Appl. No.: 11/504,667

(22) Filed: Aug. 16, 2006

(65) Prior Publication Data

US 2007/0044615 A1 Mar. 1, 2007

(30) Foreign Application Priority Data

Aug. 29, 2005 (TW) ............................... 94214866 U

(51) Int. Cl.
*B26D 7/26* (2006.01)
(52) U.S. Cl. ..................... 83/522.18; 83/473; 83/477.2; 83/508.2
(58) Field of Classification Search .................. 83/477, 83/477.1, 477.2, 508.2, 522.15–522.25
See application file for complete search history.

(56) References Cited

U.S. PATENT DOCUMENTS

| | | | | |
|---|---|---|---|---|
| 537,082 | A * | 4/1895 | Stuart | ........................... 33/762 |
| 2,555,642 | A * | 6/1951 | Hahus | ......................... 83/721 |
| 2,710,633 | A | 6/1955 | Oberg | |
| 2,750,970 | A | 6/1956 | Gaskell | |
| 3,538,964 | A | 11/1970 | Warrick | |
| 5,207,007 | A | 5/1993 | Cucinotta et al. | |
| 5,735,054 | A | 4/1998 | Cole | |
| 5,988,031 | A | 11/1999 | Wixey | |
| 6,032,896 | A * | 3/2000 | Liu | ......................... 242/381.6 |
| 6,195,905 | B1 | 3/2001 | Cole | |
| 6,283,002 | B1 * | 9/2001 | Chiang | ...................... 83/477.1 |
| 6,543,324 | B2 | 4/2003 | Dils | |
| 6,971,185 | B2 * | 12/2005 | Scarborough | ................ 33/765 |
| 6,978,552 | B1 * | 12/2005 | Sluder | ......................... 33/640 |
| 7,066,069 | B2 | 6/2006 | Ku et al. | |
| 7,121,179 | B2 * | 10/2006 | Chen | ....................... 83/522.16 |
| 2002/0174755 | A1 * | 11/2002 | Behne et al. | ................... 83/446 |
| 2004/0107815 | A1 * | 6/2004 | Chin-Chin | ................. 83/477.1 |
| 2004/0129125 | A1 | 7/2004 | Colquhoun | |
| 2004/0237742 | A1 * | 12/2004 | Liao et al. | ...................... 83/473 |

FOREIGN PATENT DOCUMENTS

| | | | |
|---|---|---|---|
| EP | 0388098 | * | 3/1999 |
| GB | 2115969 | * | 1/1982 |

* cited by examiner

*Primary Examiner*—Boyer D. Ashley
*Assistant Examiner*—Joseph Defrank
(74) *Attorney, Agent, or Firm*—Browdy and Neimark, P.L.L.C.

(57) ABSTRACT

A table saw includes a worktable, a base supporting the worktable, a rotary saw blade extending through a cutting slot of the worktable, a saw blade holder pivotally disposed inside the base and mounting with the rotary saw blade, and an indicator having a scale member mounted to the table saw, and a connecting member. The connecting member has a first end connected to a non-pivotal point of the saw blade holder, and a second end connected to the scale member. When the saw blade holder is rotated, the saw blade holder results in a displacement of the saw blade and a movement of the scale member corresponding to the displacement of the saw blade through actuation of the connecting member.

14 Claims, 5 Drawing Sheets

TABLE SAW

BACKGROUND OF THE INVENTION

1. Field of the Invention

The present invention relates to a table saw, and more particularly to a table saw having an indicator capable of indicating a displacement of a saw blade.

2. Description of the Related Art

A conventional table saw generally comprises a worktable for carrying a workpiece, a base for supporting the worktable, a saw blade holder pivotally mounted inside the base below the worktable, and a rotary saw blade mounted to the saw blade holder and extending through a cutting slot of the worktable for cutting the workpiece. The saw blade holder has a motor operable to rotate the saw blade. According to a specific cutting requirement, the user can make the saw blade holder pivot to vertically move the saw blade relative to the worktable to adjust the saw blade to a desired height relative to the worktable; thereby the workpiece can be processed by various cutting heights.

In order to know the accurate height of the saw blade relative to the worktable, the user may use a measuring tape to measure the height of the saw blade before an adjusting action. After the adjusting action, the user needs to measure the height of the saw blade by the tape again to check the accuracy of the adjustment. Several attempts may be necessary before the accurate position is reached. This saw blade height adjustment procedure is complicated, and wastes much time. Further, using a measuring tape to measure the height of the saw blade may result in a reading error. Therefore, the aforesaid saw blade height measuring and adjusting method brings inconvenience to the user.

US patent publication ser. No. 2004/0129125 discloses a table saw with markings on a saw blade for indicating the cutting depth of the saw blade into the workpiece. However, the markings may be worn off by using of the saw blade. Further, U.S. Pat. No. 6,543,324, entitled "Table saw throat plate with blade height scale", discloses a throat plate insert for a table saw which has a scale on the upper side thereof adjacent the region of the elongated cutting slot for the circular saw blade. The scale provides an indication of a height of a saw blade, protruding through the elongate cutting slot, with one of some specific diameters. However, the design is still not satisfying in application. This is because cutting chips mask the scale easily, and the user must align a tip of a tooth of the saw blade with the scale to ensure accurate indication. When making the alignment, the teeth of the saw blade may injure the user's hand accidentally.

SUMMARY OF THE INVENTION

The present invention has been accomplished under the circumstances in view. It is an objective of the present invention to provide a table saw, which quickly and accurately indicates a height of the saw blade.

To achieve this objective of the present invention, the table saw comprises a worktable, a base supporting the worktable, a rotary saw blade extending through a cutting slot of the worktable, a saw blade holder pivotally disposed inside the base and mounting with the rotary saw blade, and an indicator. The indicator comprises a scale member mounted to the table saw and a connecting member. The connecting member has a first end connected to a non-pivotal point of the saw blade holder, and a second end connected to the scale member. When the saw blade holder is rotated, the saw blade holder results in a displacement of the saw blade and a movement of the scale member corresponding to the displacement of the saw blade through actuation of the connecting member.

In the embodiments of the present invention, the displacement of the saw blade is a height change of the saw blade relative to the worktable. The scale member has a plurality of graduations for indicating the height of the saw blade relative to the worktable. When the height of the saw blade is changed, the graduations of the scale member are moved correspondingly, thereby indicating the real-time height of the saw blade. Therefore, the table saw of the present invention enables the user to know the current height of the saw blade easily and conveniently, and then allows the user to adjust the saw blade to a predetermined height quickly and accurately. This facilitates the performance of cutting work a lot.

DETAILED DESCRIPTION OF THE INVENTION

Figure 1:
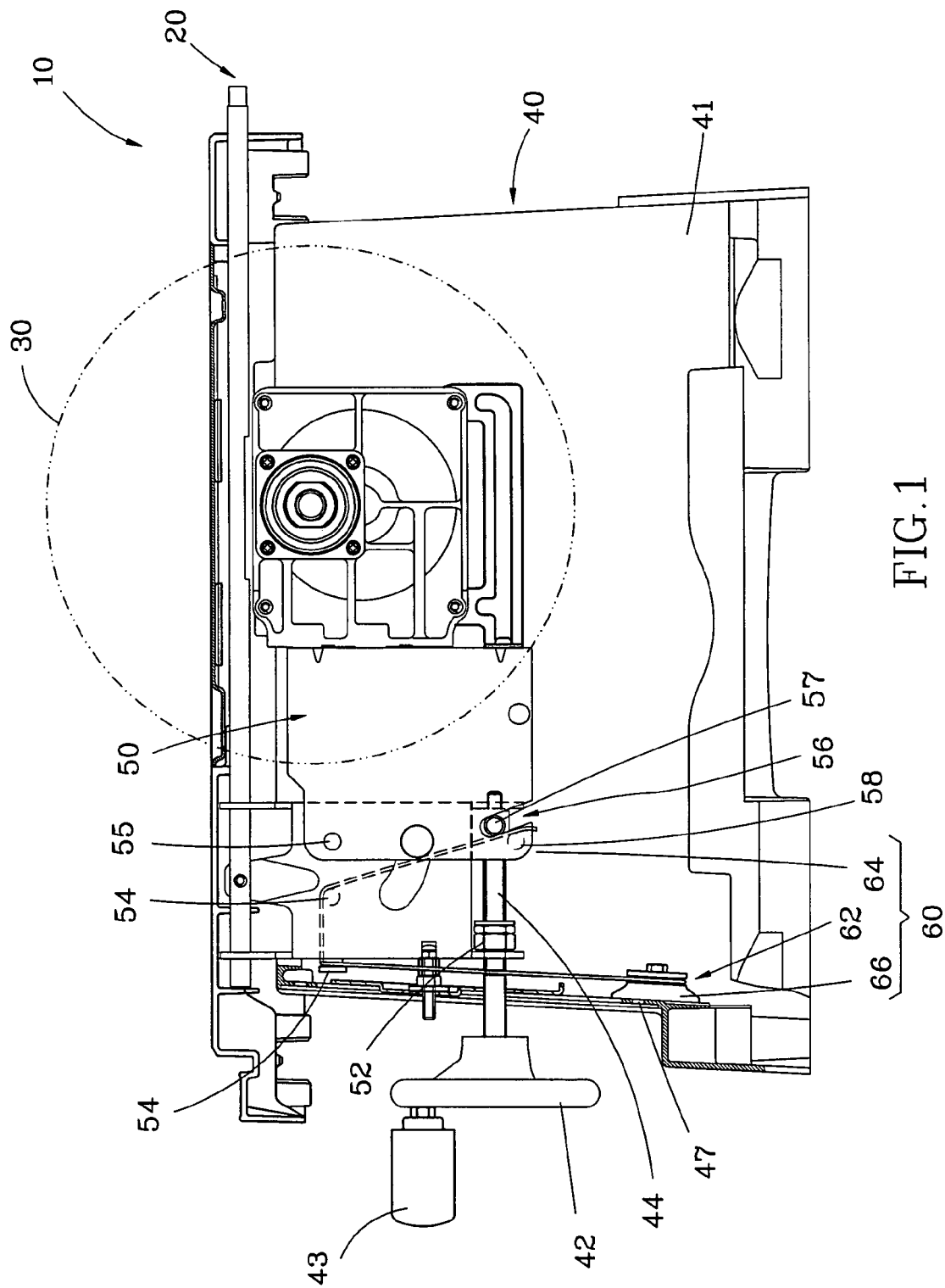
FIG. 1 is a sectional view of a table saw in accordance with the first preferred embodiment of the present invention.

As shown in FIG. 1, a table saw 10 in accordance with a first preferred embodiment of the present invention comprises a worktable 20, a rotary saw blade 30, a base 40, a saw blade holder 50, and an indicator 60.

The worktable 20 is adapted to carry a workpiece (not shown). The worktable 20 has a cutting slot (not shown) through which the rotary saw blade 30 extends for cutting the workpiece.

Figure 4:
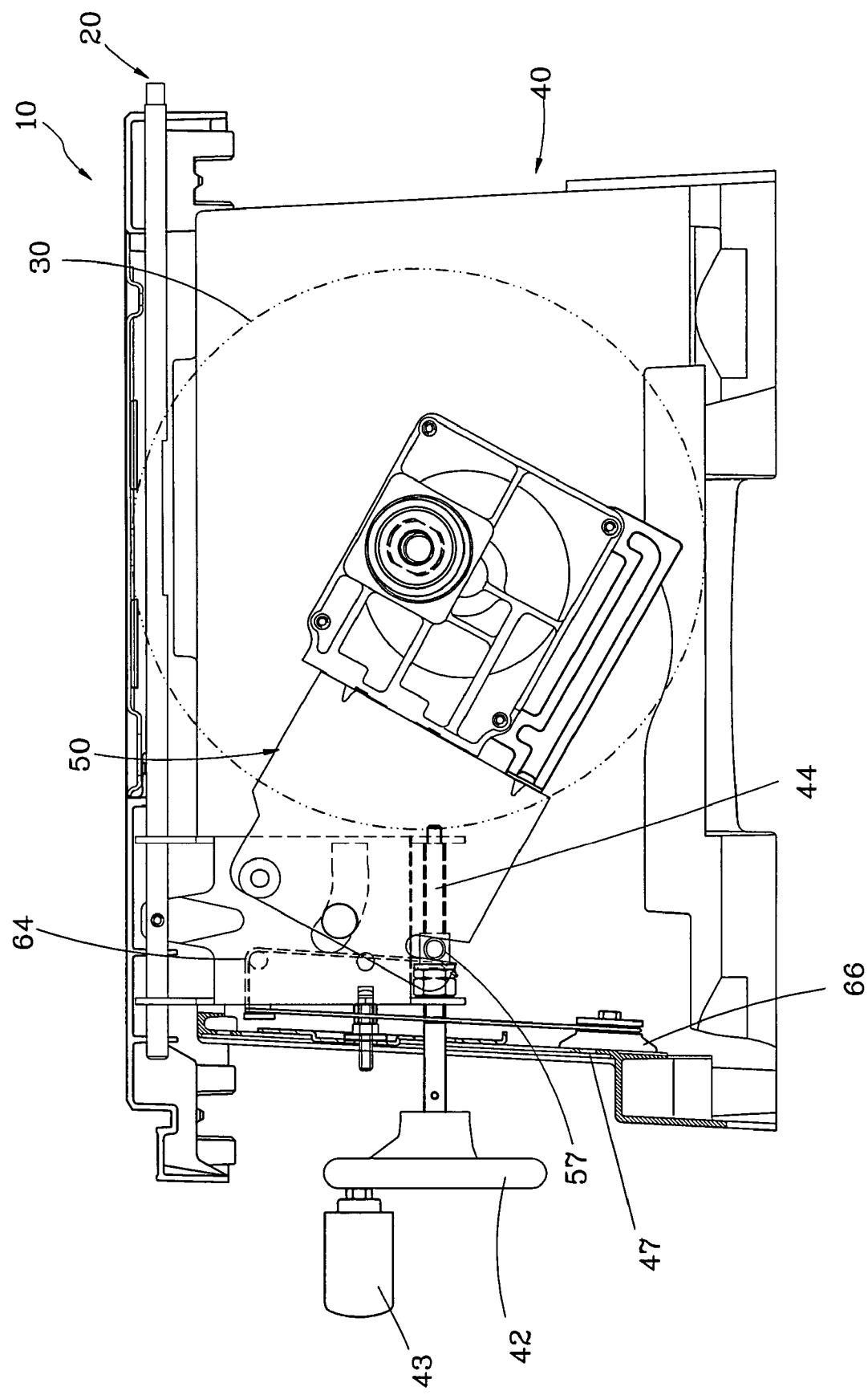
FIG. 4 is similar to FIG. 1 but showing the height of the saw blade adjusted.

The base 40 is provided at the bottom side of the worktable 20 to support the worktable 20. The saw blade holder 50 carries a motor (not shown). The saw blade 30 is mounted to the saw blade holder 50 and rotated by the motor for cutting the workpiece. Moreover, the saw blade holder 50 has a mounting member 55 and a guide slot 56. By means of using the mounting member 55 as a pivotal point of the saw blade holder 50, the saw blade holder 50 is pivotally disposed inside a chamber 41 of the base 40 below the worktable 20. A threaded rod 44 is mounted inside the chamber 41. A movable member 57 is screwed onto the threaded rod 44 and inserted into the guide slot 56. When rotating the threaded rod 44, the movable member 57 is moved along the length of the threaded rod 44. Because the movable member 57 is inserted into the guide slot 56, moving the movable member 57 along the length of the threaded rod 44 causes the moveable member 57 to push against an inner wall of the guide slot 56 and slide the movable member in the guide slot 56. This forces the saw blade holder 50 to rotate to move the saw blade upwards or downwards through the cutting slot relative to the worktable 20 due to a displacement of the saw blade 30 moving along with the saw blade holder 50, as shown in FIGS. 1 and 4.

The threaded rod 44 has one end extending out of the base 40. A hand wheel 42 is fastened to the outer end of the threaded rod 44 outside the base 40. A handle 43 is rotatably and perpendicularly connected to the border area of the hand wheel 42. Therefore, the user can hold the handle 43 with the hand to rotate the wheel 42 to synchronously rotate the threaded rod 44.

The indicator 60 has a scale member 62 and a connecting member 64. The connecting member 64 according to this embodiment is a line, preferably a metal line. The base 40 is provided with a guide member 54 therein. According to this embodiment, the guide member 54 is formed of two screws. The connecting member 64 has a first end fixedly connected to a screw 58 that is screwed into a non-pivotal point of the saw blade holder 50, and a second end extending over the screws 54 and then connected to the scale member 62. The scale member 62 is pivoted to the base 40. The screws 54 change the extending direction of the connecting member 64.

Figure 2:
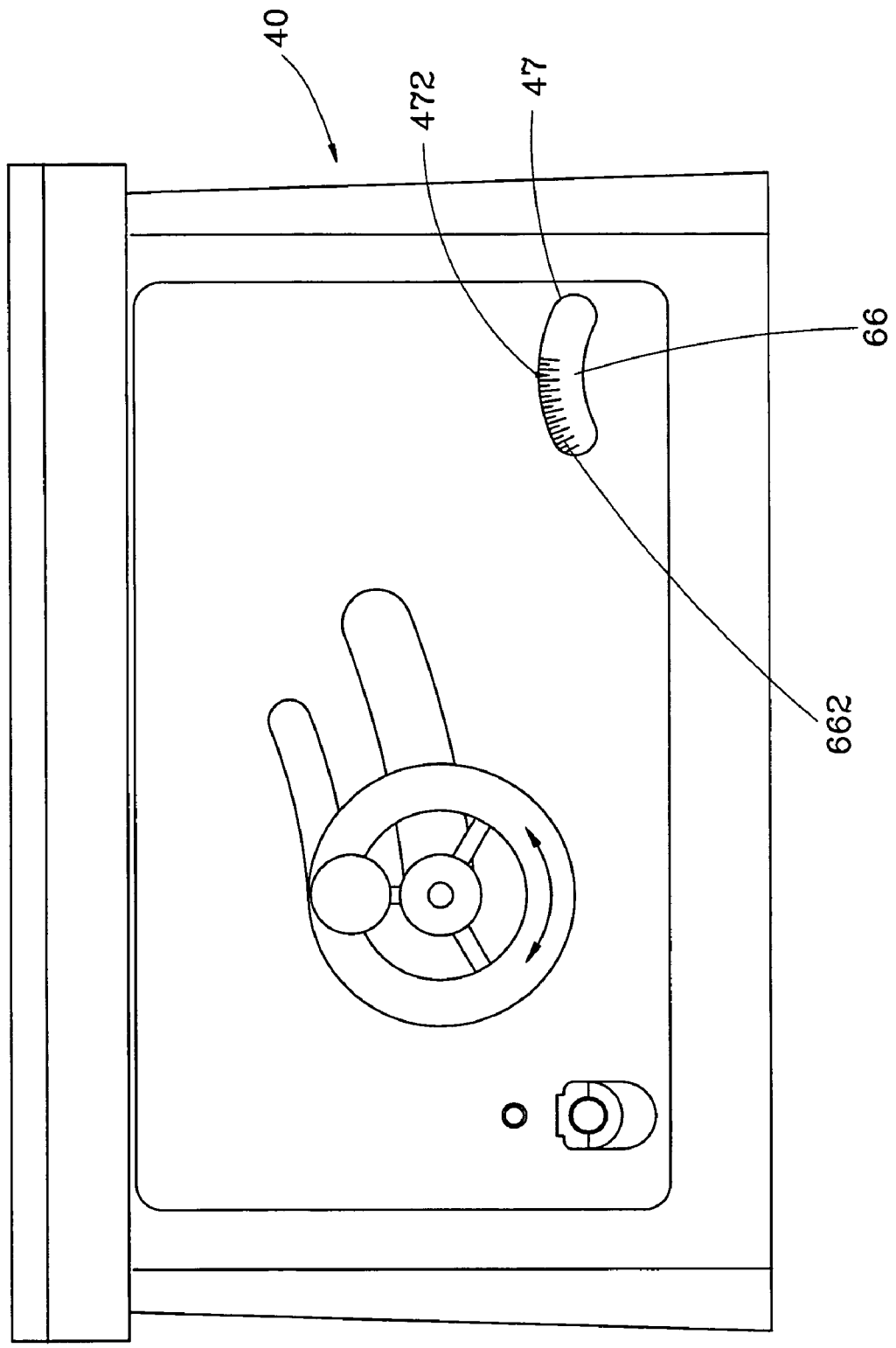
FIG. 2 is a front view of the table saw in accordance with the first preferred embodiment of the present invention.
Figure 3:
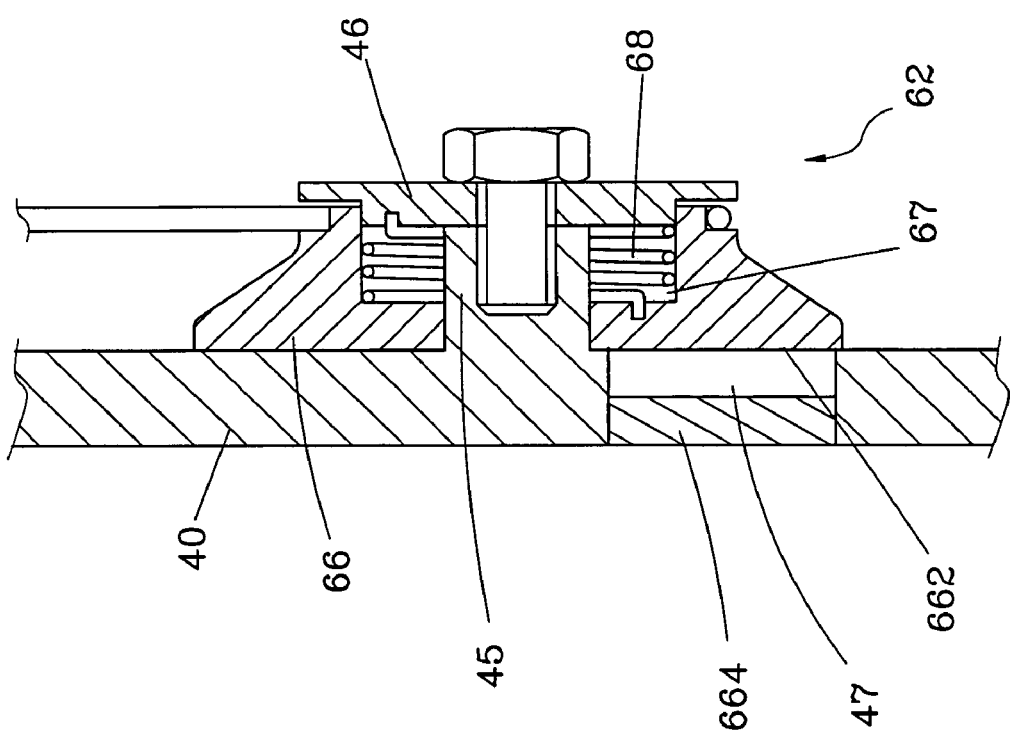
FIG. 3 is a sectional view of the scale member of the indicator of the table saw in accordance with the first preferred embodiment of the present invention.

Referring to FIGS. 2 and 3, the scale member 62 comprises a wheel 66 and a spring 68. The base 40 has a pivot 45 extending inwardly. The wheel 66 is rotatably mounted on the pivot 45. A locating plate 46 is mounted to the distal end of the pivot 45 to hold the wheel 66 in place, preventing the wheel 66 from escaping from the pivot 45. A side of the wheel 66 that faces the base 40 is provided with an index zone 662 marked with a plurality of graduations. The base 40 has a through hole 47 corresponding in location to the index zone 662 of the wheel 66. The through hole 47 is covered with a transparent cover 664 such that the index zone 662 is exposed through the through hole. Further, a pointer 472 is marked on the base 40 adjacent to the through hole 47 for pointing out one of the graduations of the index zone 662. The spring 68 is a torsion spring mounted in a recess 67 of the wheel 66, having two ends respectively connected to the wheel 66 and the locating plate 46. When the wheel 66 is rotated, the torsion spring 68 is deformed to provide a torque.

Referring to FIG. 4, when a user conducts an adjustment procedure, the user can hold and rotate the handle 43 to drive the wheel 42 and make the threaded rod 44 rotate synchronously so as to move the movable member 57 along the threaded rod 44 toward the base 40 (toward the left side in FIG. 4), causing the saw blade holder 50 to rotate clockwise to lower the saw blade 30. During the clockwise rotation of the saw blade holder 50, the saw blade holder 50 also drives the connecting member 64 to pull the wheel 66 to rotate, causing the movement of the graduations of the index zone 662 of the wheel 66 relative to the pointer 472. Therefore, the pointer 472 indicates the height of the saw blade 30 relative to the worktable 20 after the saw blade 30 is lowered. On the contrary, when rotating the handle 43 in the reversed direction, the movable member 57 is moved along the threaded rod 44 away from the base 40 (toward the right side in FIG. 4), causing the saw blade holder 50 to rotate counterclockwise to lift the saw blade 30. During the counterclockwise rotation of the saw blade holder 50, the connecting member 64 is loosened, and the torsion spring 68 immediately reverses the wheel 66, causing the reversed movement of the graduations of the index zone 662 of the wheel 66 relative to the pointer 472. Therefore the pointer 472 indicates the height of the saw blade 30 relative to the worktable 20 after the saw blade 30 is lifted.

When wanting to lift the saw blade 30 to a desired height, the user can read the graduation pointed out on the index zone 662 by the pointer 472 through the through hole 47 to know the current height of the saw blade 30, and then make adjustment properly. Further, during cutting work, the user can also check the height of the saw blade 30 through the through hole 47 to ensure accuracy of the height.

In the first preferred embodiment, the scale member 62 is pivotally mounted to the base 40. However, in an alternative structure, the scale member 62 can be pivotally mounted to the worktable 20, and the through hole 47 is opened in the worktable 20 corresponding in location to the scale member 62, thereby enabling the user to directly read the indication of the scale member 62 from above the worktable 20. Consequently, the saw blade height indicator provided by the present invention can indicate the height of the saw blade 30 relative to the worktable 20 rapidly and accurately, thereby facilitating the performance of cutting work.

Figure 5:
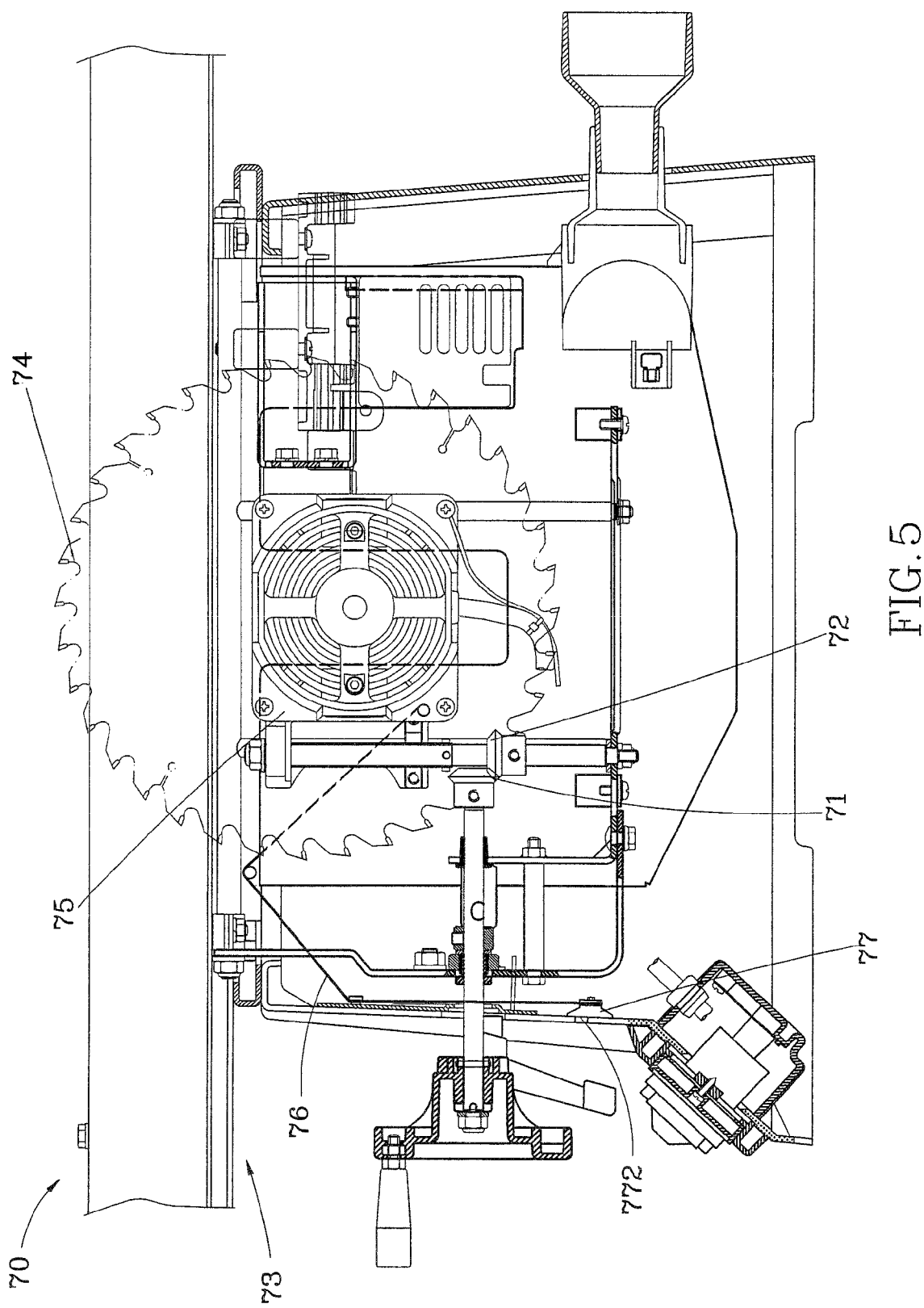
FIG. 5 is a schematic drawing showing a table saw in accordance with a second preferred embodiment of the present invention.

FIG. 5 shows a table saw 70 in accordance with a second preferred embodiment of the present invention. This embodiment is substantially similar to the aforesaid first preferred embodiment with the exception of the following features.

According to this embodiment, the engagement between a first bevel gear 71 and a second bevel gear 72 allows vertical movement of the saw blade holder 75 relative to the worktable 75. During vertical movement of the saw blade holder 75, the saw blade holder 75 drags the connecting member 76 to cause rotation of the wheel 77 and then movement of the graduations of the index zone 772 to show the height of the saw blade 74 relative to the worktable 73.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A table saw comprising:
   a worktable having a cutting slot;
   a rotary saw blade extending through the cutting slot;
   a base connected to the worktable for supporting the worktable;
   a saw blade holder pivotally disposed on and inside the base and holding the rotary saw blade so that the saw blade is rotated to move up and down through the cutting slot when the saw blade holder is pivoted on the base; and
   an indicator including a scale member and a connecting member having a first end connected to a non-pivotal point of the saw blade holder, and a second end connected to the scale member;
   wherein rotating the saw blade holder results in a displacement of the saw blade and a movement of the scale member corresponding to the displacement of the saw blade through actuation of the connecting member when the saw blade holder is rotated;
   wherein the scale member comprises a wheel pivotally connected to the table saw and provided with an index zone for indicating the movement of the scale member, and a spring having an end connected to the wheel for providing a biasing force to the wheel; and
   wherein the displacement of the saw blade by rotation of the saw blade holder is a displacement in height relative to the worktable.

2. The table saw as claimed in claim 1, wherein the second end of the connecting member is connected to the wheel.

3. The table saw as claimed in claim 1, wherein the spring is a torsion spring.

4. The table saw as claimed in claim 1, wherein the wheel is pivotally connected to the base.

5. The table saw as claimed in claim 4, wherein the base comprises a pivot onto which the wheel is pivotally mounted.

6. The table saw as claimed in claim 5, wherein the pivot of the base has a distal end mounted with a locating plate for preventing the wheel from escaping from the pivot.

7. The table saw as claimed in claim 6, wherein the spring has the other end connected to the locating plate.

8. The table saw as claimed in claim 4, wherein the base has a through hole corresponding in location to the index zone of the wheel such that the index zone of the wheel is exposed through the through hole.

9. The table saw as claimed in claim 8, wherein the base has a transparent cover covering the through hole of the base.

10. The table saw as claimed in claim 1, wherein the index zone of the wheel is marked with a plurality of graduations.

11. The table saw as claimed in claim 1, wherein the wheel has a recess for accommodating the spring.

12. The table saw as claimed in claim 1, wherein the connecting member is a line.

13. The table saw as claimed in claim 12, further comprising at least one guide member for guiding an extending direction of the line.

14. The table saw as claimed in claim 13, wherein the guide member is a screw.

* * * * *